Figure 12:
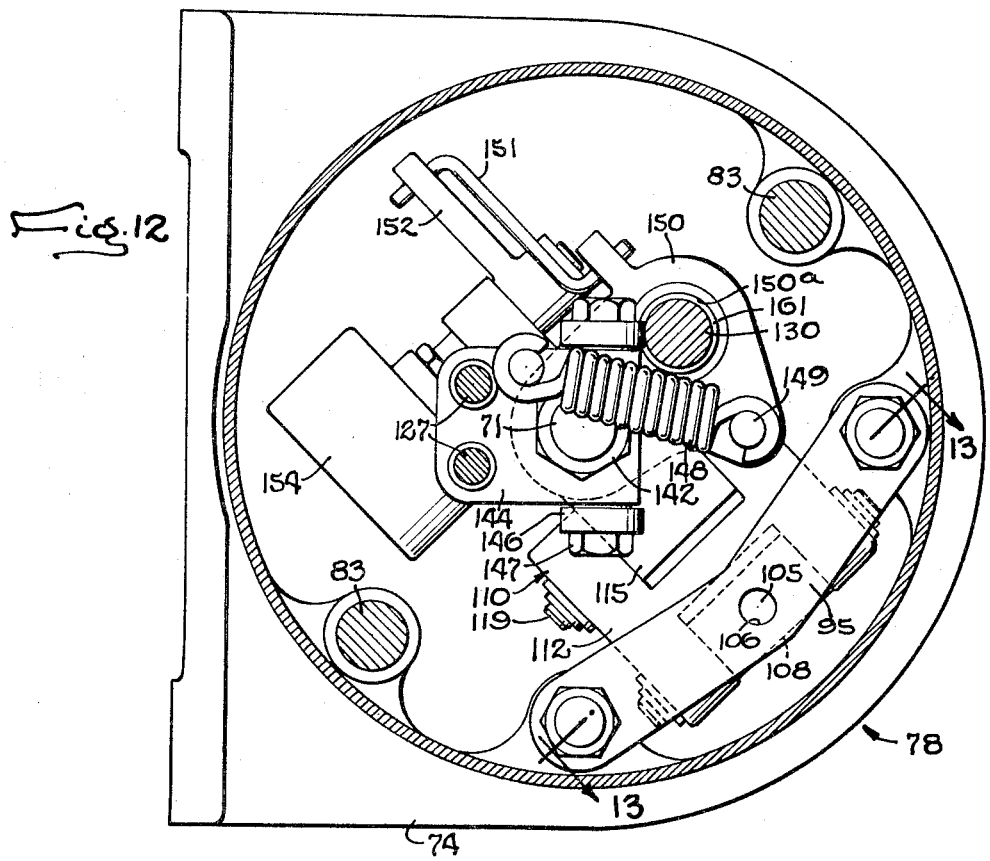

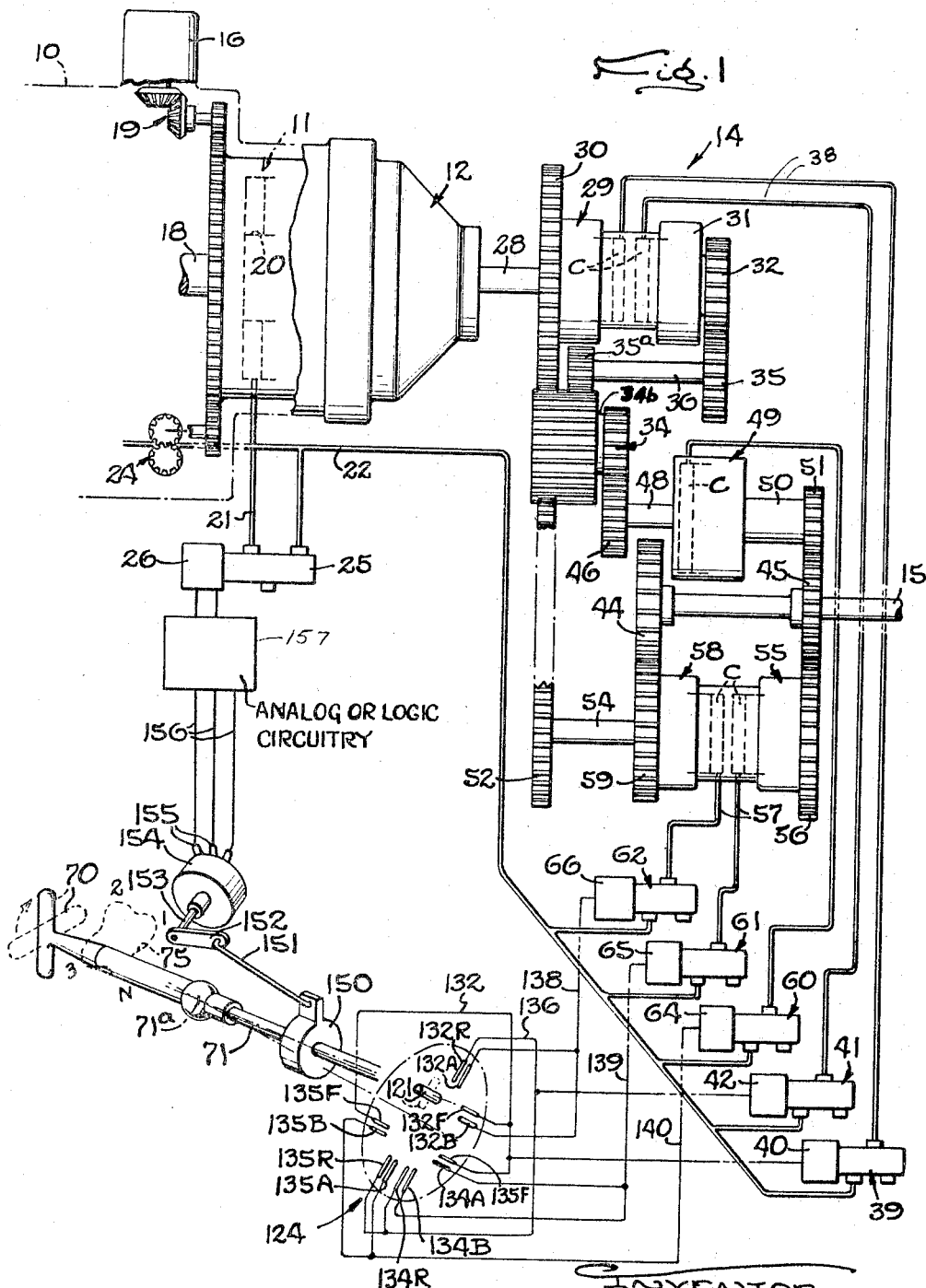

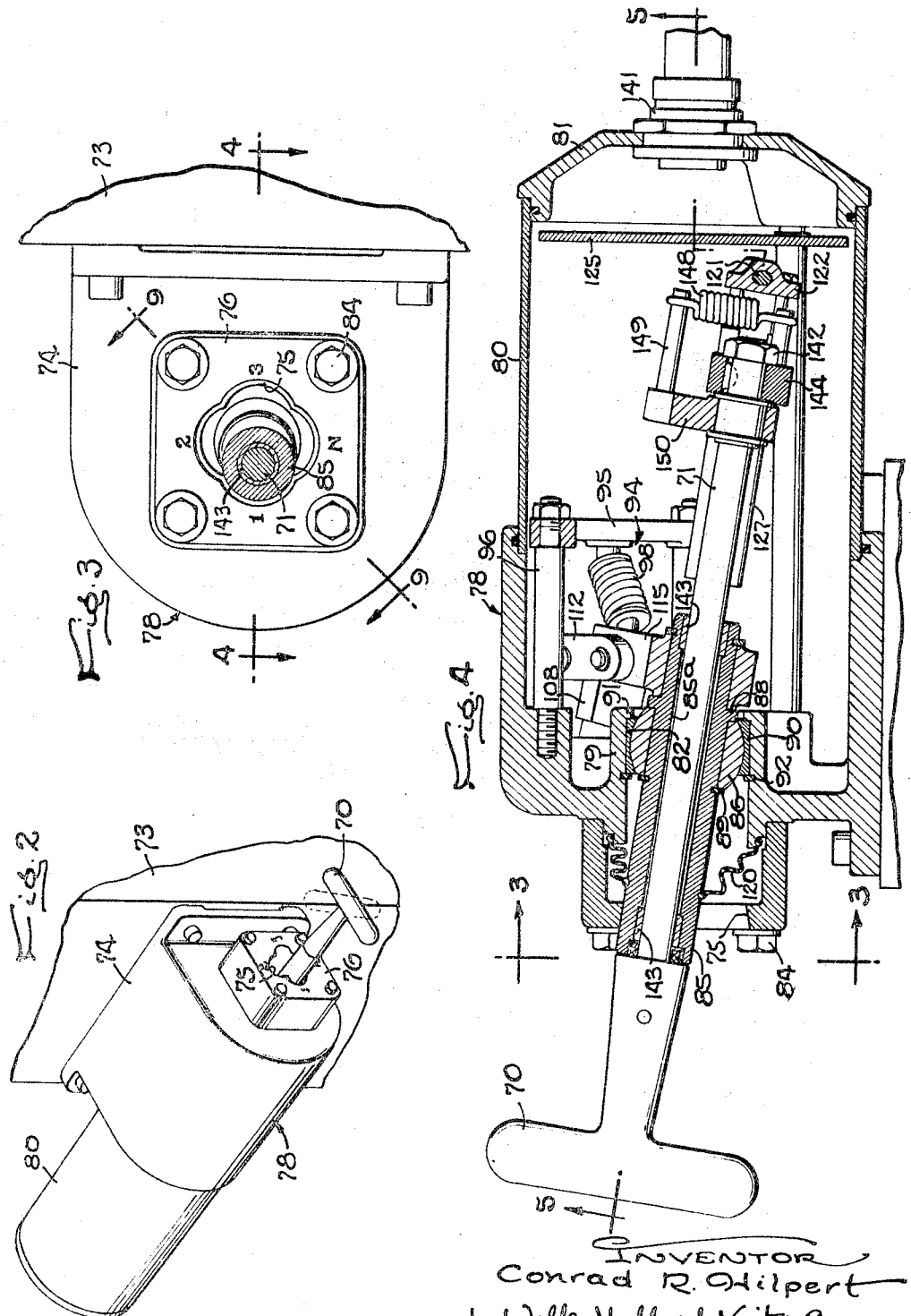

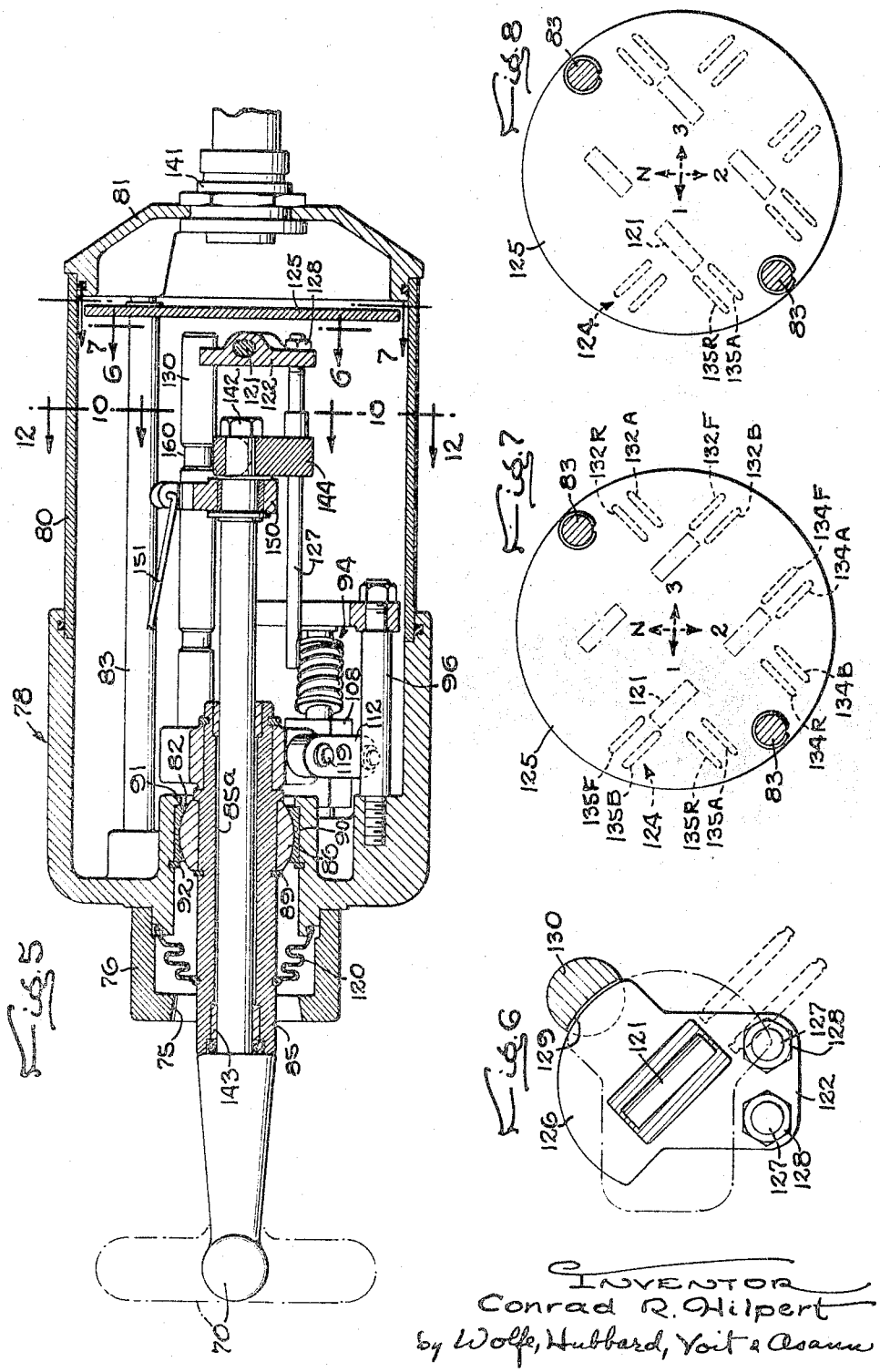

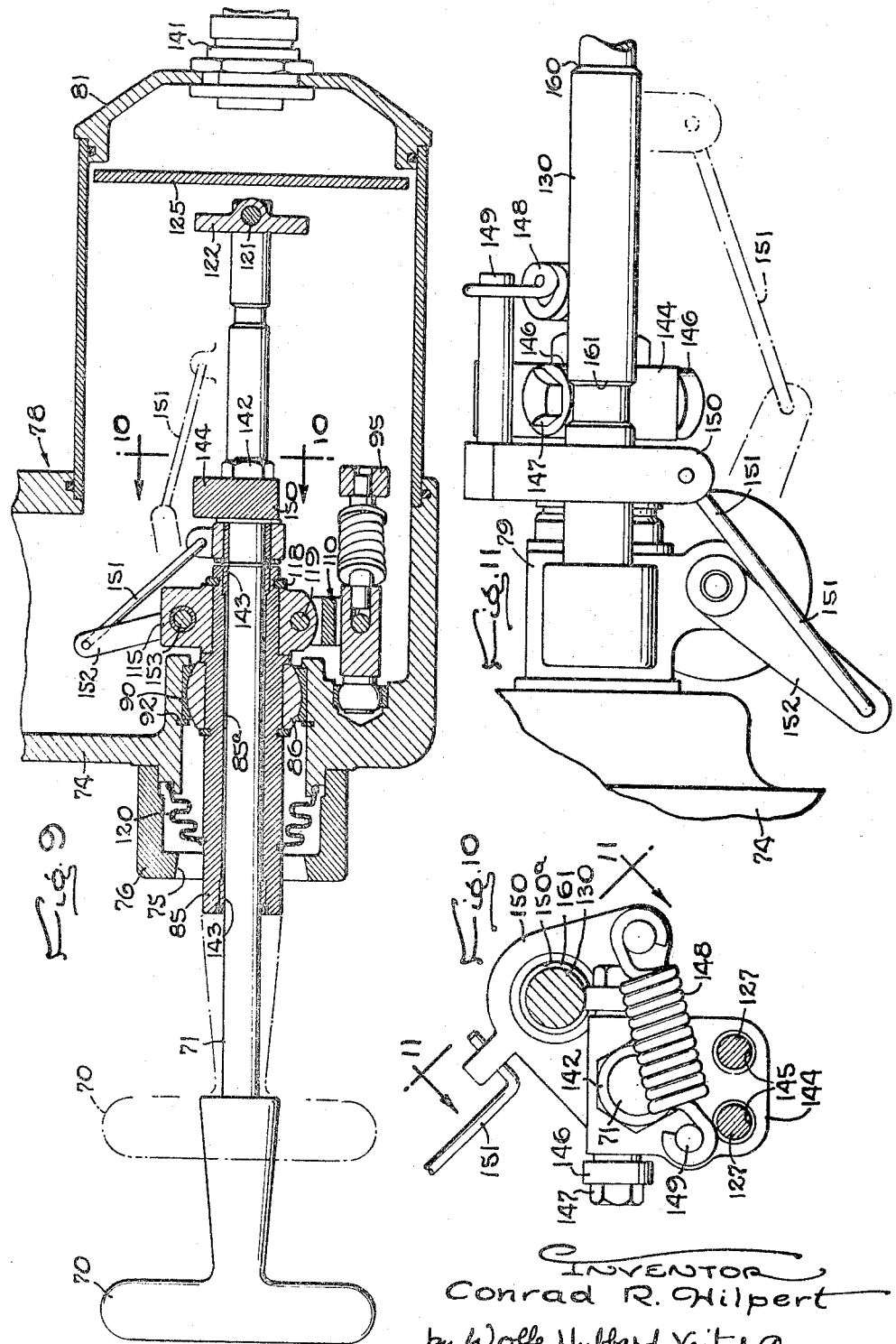

INVENTOR
Conrad R. Hilpert
by Wolfe, Hubbard, Voit & Osann
ATTORNEY

United States Patent Office 3,319,745
Patented May 16, 1967

3,319,745
TRANSMISSION AND CLUTCH WITH SINGLE CONTROL
Conrad R. Hilpert, Winnebago, Ill., assignor to Twin Disc Clutch Company, Racine, Wis., a corporation of Wisconsin
Filed July 19, 1965, Ser. No. 473,122
8 Claims. (Cl. 192—3.5)

This invention relates to a control mechanism for regulating the various power drive functions of a power system, and more particularly to a control mechanism for regulating the drive ratio, drive direction and speed of a vehicle, such as a bulldozer.

In maneuvering bulldozers or similar type vehicles, the operator is heavily taxed to manipulate all the controls for regulating the ground speed and guiding the vehicle, in addition to regulating simultaneously the various auxiliary drives, such as those for raising and lowering the blade of a bulldozer or adjusting the height of the scrapper of a self-loading earth hauler. He must not only control these several power functions of the vehicle, but must do so while being bounced around as the vehicle moves over the very rough ground usually present at the work site. Also he is required to manipulate the control for the most part while not looking at them, since he must watch constantly the position of the blade or scraper with respect to grade markers and the like by which the earth moving must be guided, making the gear shifting and driving of the vehicle even more difficult.

The general aim of this invention is to provide a control mechanism which greatly simplifies the operator's task of driving a bulldozer or like vehicle. In line with this general aim, the primary object of this invention is to provide a control mechanism having a single handle which the operator can grasp with one hand, and simultaneously control a plurality of functions of the bulldozer by pivoting, rotating and pushing and pulling on that single handle.

A further object of this invention is to provide a control mechanism having a handle which the operator can grasp, and by sensing the position of the handle, immediately tell the drive conditions to which the bulldozer is at that moment.

A more specific object of this invention is to provide a control mechanism having a single handle which the operator can manipulate to regulate the drive ratio and drive direction of a multi-ratio transmission, and the speed of the output shaft, to thereby regulate the ground speed and drive direction of the bulldozer.

Another object of this invention is to provide a control mechanism having a single handle which may be moved to regulate a plurality of power functions of the bulldozer, and which enables the operator to adjust any one of the power functions without changing the adjustment of any of the other power functions.

A more detailed object of this invention is to provide a control mechanism having a single handle which the operator may move for setting a reversible-drive multi-ratio transmission into its various drive ratios, and enabling him to shift directly from any drive ratio to any other drive ratio without having to pass through any intermediate ratios.

In the drawings,

FIGURE 1 is a fragmentary view of a power system with which the control mechanism may be used showing the control mechanism in fragmentary perspective view and showing the power drive system of a bulldozer in schematic form.

Figure 13:
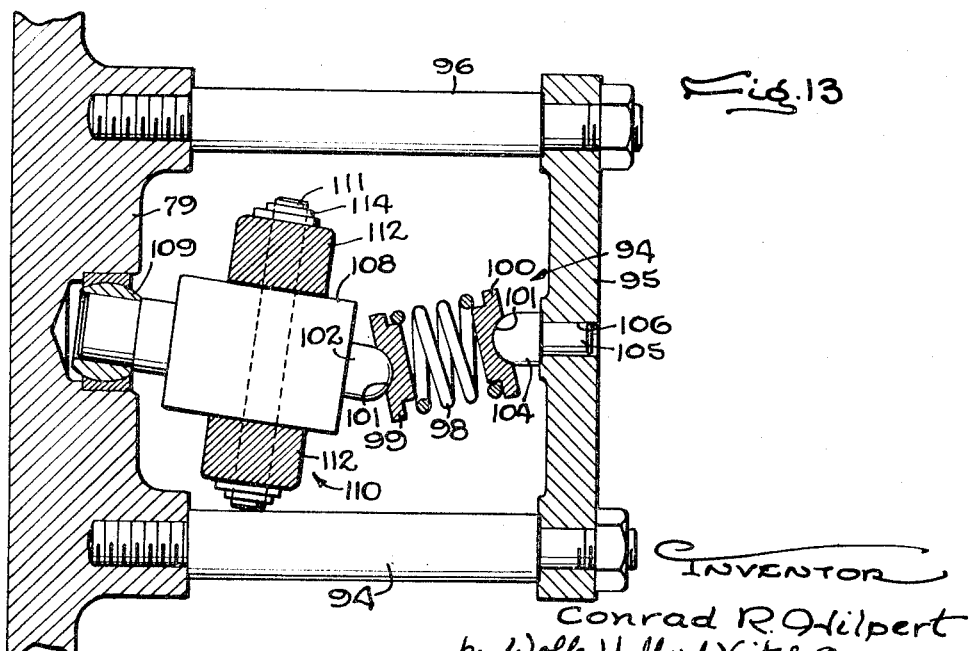

FIG. 2 is a perspective view of the control mechanism showing the positions to which the handle may be rotated, FIG. 3 is a view along the line 3—3 of FIG. 4, FIG. 4 is a cross-sectional view of the control mechanism along the line 4—4 of FIG. 3, FIG. 5 is a cross-sectional view along the line 5—5 of FIG. 4, FIG. 6 is a cross-sectional view along the line 6—6 of FIG. 5, FIG. 7 is a cross-sectional view along the line 7—7 of FIG. 5 showing the positions of the magnet in dotted and dot-dash outline as the handle is pivoted into the various forward drive ratio positions, FIG. 8 is a view similar to FIG. 7 showing the positions of the magnet in dotted and dot-dash outline as the handle is pivoted into the various reverse drive ratio positions, FIG. 9 is a cross-sectional view along the line 9—9 of FIG. 3 showing the range of movement of the mechanism for adjusting the potentiometer as the handle is pushed and pulled to set the speed of the driven shaft, FIG. 10 is an enlarged cross-sectional view along the line 10—10 of FIG. 9, FIG. 11 is a cross-sectional view along the line 11—11 of FIG. 10 again showing the moved potentiometer arm in dotted outline, FIG. 12 is an enlarged cross-sectional view of the mechanism shown on dead center and taken along the line 12—12 of FIG. 5, and FIG. 13 is a view of the over-center positioning mechanism along the line 13—13 of FIG. 12.

In FIG. 1 is shown a power system for driving a load (not shown) including a prime mover or engine 10 connected to a drive train which includes a primary clutch 11, a torque converter 12 and a multi-ratio reversible-drive transmission 14, all connected in tandem for driving the load through an output shaft 15. The engine preferably is a constant speed type, controlled by a governor 16 regulating the fuel input thereto and connected to be driven by the output shaft 18 of the engine through a gear train 19.

The clutch 11 is a modulated type clutch which is well known and which may be operated continuously at any degree of slippage to provide speed variation of the drive train powered by the constant speed engine 10. The clutch is engaged by introduction of pressure fluid into a cavity 20 which results in a force proportional to the pressure of the fluid in the cavity being exerted to urge the clutch plates (not shown) together, with one set of plates being drivingly connected with the output shaft 18 of the engine and the other set being connected with the torque convertor 12. Pressure fluid for engaging the clutch is supplied through hydraulic lines 22 and 21 leading from an engine driven hydraulic pump 24. A modulating valve 25 connects these lines for regulating the pressure of the fluid transmitted to the clutch. This modulating valve is actuated by an electric solenoid 26, with the degree of actuation, or opening of the valve, dependent upon the degree of energization of the solenoid. The torque convertor 12 functions to cushion the shock inherent in connecting and disconnecting the load and the engine and preferably includes at least two rotating vane assemblies (not shown) which transmit torque therebetween by propelling hydraulic fluid from one to the other, with one vane assembly being driven by clutch 11 and the other being drivingly connected to an output shaft 28.

The transmission 14 permits selection of the drive direction and the gear ratio of the drive connection between the torque convertor output shaft 28 and the power system output shaft 15. In this instance forward and reverse drive gear trains are in series drive connection with three drive ratio gear trains, making it possible to power the output shaft in forward or reverse drive direction in any one of three drive ratios. Specifically, the transmission connects with the shaft 28 through a forward drive clutch 29 forming a driving connection with an input gear 30, and a reverse drive clutch 31 forming a driving connection with an input gear 32. For forward drive, the clutch 29 is engaged to drive a compound idler gear 34 in the forward direction directly from the shaft 28 through the input gear 30, the gear 34 being fast on a shaft 34b. For reverse drive, the clutch 31 is engaged to drive the gear 32 which, through intermediate reversing gears 35 and 35a fixed on a layshaft 36, drives the idler gear 34 in the reverse direction. Pressure fluid is supplied to clutch cavities C through pressure lines 38 connecting with the pressured fluid line 22 for engaging these clutches, with the flow to clutch 29 being controlled by a valve 39 actuated by the energization of a solenoid coil 40 and the flow to clutch 31 being controlled by a valve 41 actuated by energization of a solenoid coil 42.

Three parallel gear trains connect the idler gear 34 to output gears 44 and 45 which are attached to the output shaft 15 and which may be selectively engaged to establish first, second and third drive ratios. The first such drive train includes an intermediate gear 46 meshing with the idler gear 34 on a layshaft 48 and placed in driving connection with a shaft 50 and a gear 51 meshing with the output gear 45 by engagement of a clutch 49. The second drive train includes an intermediate gear 52 meshing with the idler gear 34 and driving a layshaft 54 which, by engagement of a clutch 55, is placed in driving engagement with a gear 56 driving the output gear 45. The third drive train includes the gear 52 driving a layshaft 54 which by engagement of a clutch 58, powers a gear 59 in driving engagement with the output gear 44. The clutches 49, 55 and 58 are engaged by the introduction of pressure fluid from the line 22 through lines 57 and into cavities C of the individual clutches, with the flow of pressure fluid being controlled by valves 60, 61 and 62 actuated by the energization of solenoid coils 64, 65 and 66 respectively, to complete the first, second or third transmission drive ratios.

The present invention contemplates the provisions of a novel control mechanism which is operated by a single control member 70 to control the several functions of the power drive system. Thus, the member 70, which may conveniently be a handle on the end of a rod 71 (FIGS. 1 and 4), is arranged in such a manner that it may be given three distinct types of motion and one motion controls the direction of drive, a second motion selects the drive ratio and a third motion regulates the speed of the output shaft 15 within the range of the selected ratio. More specifically, the control rod 71 is mounted so that it may be turned about its axis, pivoted about a point disposed along its axis and moved longitudinally back and forth. With the foregoing arrangement, the handle 70 and rod 71 may be rotated between two angular positions 90 degrees apart as indicated by the solid and broken lines in FIG. 1. One of these positions selects the forward drive direction and the other position the reverse direction. Also, the rod may be swiveled about the point 71a in various directions to select one of the drive ratios or a neutral position. Finally, the rod may be pushed or pulled endwise and such movement produces a proportionate change in the speed of the output shaft 15, as, in this instance, by regulating the energization of the modulated clutch 11.

For shifting the drive ratio of the multi-ratio transmission 14, the operator swivels the handle 70 and supporting rod 71 to positions corresponding to first, second and third ratios (see FIGS. 2, 3, and 4), and a neutral position where the engine and load are disconnected. To these ends, the rod 71 is supported for a swivel movement within a support 74 in a housing 78, mounted on a post 73, with the housing comprising a bushing support member 79, a drum 80 and an end bell 81 fastened together by suitable means such as by rods 83 extending between the bushing support member and the end bell. A sleeve 85 supports the rod for movement within a center opening 82 in the bushing support and an aperture 75 in an aperture plate 76 attached to the bushing support by bolts 84. The rod is also supported for independent sliding movement within the center opening 85a of the sleeve.

The sleeve 85 is supported on a spherical shaped ball bushing 86 held between a shoulder 88 and a snapring 89, and in turn supported in the opening 82 on a bushing mount 90 held between a shoulder 91 and a snapring 92. This bushing mount 90 is formed to interfit with the spherical outer surface of the bushing 86 and permit a swivel movement of the rod 71 and supporting sleeve 85 by movement of the bushing within this cooperating mount (as shown in FIG. 4). The control handle is limited in movement to the positions determined by the configuration of the aperture 75 in the plate 76, and in this instance these positions are first, second, third and neutral gear ratios coresponding with the drive-ratio capabilities of the multi-ratio transmission 14 heretofore described. Where a swivel movement is described, in some instances the rod may need only to be pivoted in one plane depending upon the requirements of the power system.

The handle is held in whichever of the four positions it is pivoted to by an over-center spring mechanism 94 (shown primarily in FIGS. 4, 9, 12 and 13). This spring mechanism is mounted within the housing 78 between a member 95 attached to the bushing support 79 by spacer bolts 96, and the bushing support. A spring 98 is compressed between two washers 99 and 100, with each washer including an outward facing recess 101 in which pivot pins 102 and 104 seat. Pin 104 is fixed directly to the support 95 by an attached stud 105 being seated in a well 106 in the support, while pin 102 is attached to a connector 108 which in turn is coupled to the bushing support 79 through a balljoint 109. As shown in FIG. 13, the force of the compressed spring 98 acting against the washers 99 and 100 is constantly opposing alinement of the pivot pins 102 and 104 by biasing pin 102 to one saide or the other of an axis of the spring mechanism joining the centers of the balljoint 109 and the pivot pin 104.

A pivot link 110 is attached to the connector 108 by a pin 111 extending through the connector and both legs 112 of the link, with lockwashers 114 on each end of the pin holding it in place. The other end of this pivot link is coupled to a collar 115 extending around the inner end of sleeve 85 and held between the shoulder 88 and a snapring 118 on the sleeve. A pin 119 positioned parallel to pin 111 passes through alined openings in the collar and link 110 to pivotally couple the spring mechanism to the sleeve 85. By reason of the collar 115 being spaced along the sleeve from the bushing 86 supporting the sleeve 85, and the fact that the axis of the spring mechanism is parallel to the sleeve when the sleeve is in the center position, the lateral force exerted by the spring 98 on the connector 108 is transmitted through the pivot link 110 and sleeve to the rod 71. The spring 98 thus spring loads the rod to one side or the other of the center position within the ball bushing to hold it in any of the radially located positions of the aperture 75 to which it is moved in selecting a transmission gear ratio. A flexible boot 120 extending around the sleeve 85 and attached to the bushing support 79 prevents dust from entering the housing 78 as the rod 71 and sleeve are pivoted.

To sense the position of the handle and rod, a magnet 121 is supported on plate 122 for movement with the pivoted end of the rod 71 which functions to actuate selected ones of a series of magnetic reed switches 124 (shown in dotted outline in FIGS. 6, 7 and 8) supported on a stationary plate 125 adjacent the arcuate path of the magnet when the magnet is moved close and alined thereto. The magnet 121 is supported on the plate 122 which is secured at one side to the end of rods 127 by threaded nuts 128 (see FIGS. 5 and 6). The opposite edge 126 of the magnet plate 122 fits into a groove 129 in a fixed guide rod 130 which is attached to the collar 115 on sleeve 85. By this arrangement, the magnet is moved along an arcuate path to one of the quadrants of movement as the rod 71 is swiveled within the aperture 75 to select one of the gear ratios of the transmission.

To sense the position of the magnet and thereby sense the pivoted positoning of the rod 71, the magnetic reed switches 124 are secured adjacent the quadrant of movement of the rod end onto the plate 125 which in turn is supported on rod 83. The specific details of these switches are not shown in the drawings since they are widely used, however they each generally comprise a pair of flexible contact arms, attached at opposite end to the end walls of a nonmagnetic cylindrical housing, usually glass, with the unsupported ends in spaced overlapping relationship. These arms are made of a magnetic material such that, when a magnet is brought close to the switch and alined to establish a flux field running lengthwise of the contact arms, a portion of the flux is diverted to pass lengthwise through the arms since the magnetic material offers a low reluctance path in comparison to the air. As this flux passes between the arms, a force is created therebetween since the field in the arm nearest the magnet naturally is greater. If the field is sufficiently strong, the force will be sufficient to bend the overlapping of the arms together and cause them to touch. An electrical circuit attached across the supported ends of the contacts is closed when these arms touch. On the other hand, if a magnet is brought close to a reed switch but positoned so the flux field lines extend normal to the contacts arms, no attraction between the arms is created since the flux field passing through each arm is substantially equal, and the switch will not be closed.

As shown in FIGS. 1, 7 and 8, two pairs of magnetic switches are positioned at each quadrant of movement of the inner end of rod 71. Reading clockwise, switches 132R, 132A, 132F and 132B are positioned in the third gear ratio quadrant, switches 134F, 134A, 134B and 134R in the second gear ratio quadrant, and switches 135A, 135R, 135B and 135F in the first gear ratio quadrant. As shown in FIG. 1, switches 132F, 134F and 135F are connected by the electrical conductor 132 to solenoid 40 of the control valve 39 which controls the flow of pressure fluid to the forward drive clutch 29. Similarly, switches 132R, 134R and 135R are connected by conductor 136 to solenoid 42 of valve 41 controlling the flow of pressure fluid to the reverse drive cluch 31. In the same manner, switches 132A and 132B, 134A and 134B, and 135A and 135B are connected to solenoids 66, 65 and 64, respectively, by conductors 138, 139, 140. A source of electrical power (not shown) is connected to the inner terminal of each reed switch such that closing of the switch will result in energizing the solenoid connected to that respective switch. All of the conductors connected with the reed switches pass out of the housing 78 through a receptacle 141 in the end bell 81.

By this arrangement, swiveled movement of the handle 70 to position the rod 71 in one of the quadrants will position the magnet 121 in the related quadrant (opposite to that of the handle since the rod is swiveled near the midpoint on the bushing 86) to close the reed switches in close proximity to and alined with the magnet. Alinement is necessary since, as heretofore explained, the reed switch must be approximately in line with the lines of flux of the magnetic field created by the magnet before the arms are drawn together.

At each quadrant are two parallel connected drive ratio switches 132A and 132B, 134A and 134B and 135A and 135B, with the switches in each pair positioned at right angles to each other. By this arrangement, movement of the magnet to any quadrant, regardless of the rotary positioning of the magnet (since as will be explained hereinafter the magnet can be positioned at any of the quadrants in either of the angular positions shown in FIGS. 7 or 8), will close one of the drive ratio switches at that quadrant to thereby effect energization of the related solenoid for opening the associated control valve and, by the introduction of pressure fluid to the corresponding clutch, shift the transmission to the corresponding drive ratio. While reed switches are not shown as being located at the neutral position since, in the absence of pressure fluid being transmitted to the transmission none of the transmission clutches is engaged to set the transmission in a drive ratio, they may be in the neutral position to function for other purposes, if desired.

In operation, to shift the transmission to the first drive ratio the handle 70 is moved to swivel the rod 71 to the first drive ratio into position (as shown in FIGS. 3 and 7), which positions the magnet 121 in one of the dotted line positions shown in FIGS. 7 and 8. The magnet thus positioned will close switch 135B or 135A to the thereby complete the electrical circuit through conductor 140 and effect energization of solenoid 64. Valve 60 is thereby opened to supply pressure fluid for engagement of clutch 49 to set the transmission in the first drive ratio. Similarly, clutches 55 and 58 can be engaged to set the transmission in the second and third drive ratios by positioning the magnet to aline with and close one of the switches 134A and 134B, or 132A and 132B, respectively.

The transmission also may be shitfed to forward or reverse drive ratio by twisting the control handle 70 to one of the two positions shown in FIG. 2. By this arrangement, the drive ratio of the transmission may be selected by pivoting the handle to one quadrant of movement and the drive direction may be selected by turning the handle to one of two positions corresponding to forward and reverse drive. To permit turning of the handle 70, the rod 71 is supported by bushings 143 positioned at the ends of the center opening 85a in the sleeve 85 such that the shaft and sleeve may be swiveled together, and the shaft may also be moved relative to the sleeve. Attached by a nut 142 to the inner end of the shaft 71 is a follower 144 (FIGS. 5, 10 and 12) with a pair of openings 145 extending therethrough in which the two rods 127 slidably fit. By this arrangement, swiveling of the handle 70 in turn swivels the rod 71, the follower 144 and the rods 127 with the attached magnet plate 122 about the bushing 86. The plate 122 may also be turned in its own plane by rotation of the rod 71 between two positions approximately 90 degrees apart, with the limits of such turning being set by contact between rollers 146, rotatably supported on the follower 144 by bolts 147, and the rod 130 secured to the bracket 115 as described before. The plate 122 slidably fits within the groove 129 in the slide rod to hold it against axial movement relative to the slide rod (FIGS. 5 and 6). A spring 148 supported between posts 149 secured to the follower 150 and the follower 144 forms an over-center mechanism to hold the follower and handle in either of the two rotated positions.

The rod 71, sleeve 85, slide rod 130 and supported magnet plate 122 may thereby be swiveled into any quadrant to set the drive ratio of the transmission, and the handle thereafter twisted between the forward and reverse positions (as shown in FIG. 2) to set the drive direction. For sensing the angular positioning of the magnet, a pair of corresponding drive ratio reed switches are positioned in each drive ratio selection quadrant at 90 degrees to each other as explained before with a forward drive reed switch positioned adjacent and parallel to one drive ratio switch and a reverse drive reed switch positioned adjacent and parallel to the other drive ratio switch. By turning the handle 70, that is, turning the handle to either the vertical (forward drive) position which alines the magnet as shown in the dotted lines in FIG. 7, or turning the handle 70 to the horizontal (reverse drive) position which alines the magnets as shown in FIG. 8, a forward or reverse direction reed switch is closed in addition to the drive ratio reed switch to cause engagement of the transmission clutches in a corresponding pattern.

In operation, after moving the handle 70 to the first drive ratio position to locate the magnet 121 as illustrated by the dotted outline shown in FIGS. 7 and 8, the handle may be twisted to the vertical position to select forward drive direction (at this time the magnet will be positioned as shown in FIG. 7) to thereby close switches 135F and 135B. Solenoids 64 and 40 are thus energized by completion of the electrical circuits through conductors 132 and 140, respectively, to open valves 60 and 39 and introduce pressure fluid to clutches 49 and 29. The transmission is thereby set to the first forward drive ratio corresponding to the positioning of the handle 70. To drive the vehicle in reverse, the handle may be rotated to the horizontal position (while not disturbing the pivotal positioning thereof) to move the magnet to the dotted line position of FIG. 8, switches 135R and 135A are now closed by the magnet, with all other switches being open, to energize solenoids 42 and 64, open valves 41 and 60 and engage clutches 31 and 49 to set the transmission to the first reverse drive ratio corresponding to the positioning of the handle.

The speed of the vehicle also can be varied by moving the handle 70 in and out to longitudinally position the rod 71, while leaving unaffected the pivotal and rotational location thereof which already has been positioned for selecting the drive ratio and drive direction of the vehicle. As explained before, the rod 71 is movable within the sleeve 85, and therefore may be slid longitudinally by pushing and pulling on the handle. In FIGS. 9 and 11 are shown the limits of longitudinal movement of the rod as it is pushed and pulled. The slide follower 150 is guided by the slide rod 130, since the rod passes through an opening 150a in the follower. Pivotally attached to the slide follower is a link 151 connecting with an arm 152. This arm 152 is fixed to a shaft 153 of a potentiometer 154 supported on the bracket 115. Longitudinal movement of the slide follower 150 and connecting link 151 thus rotates the arm 152 to position the shaft 153 radially, with the radial positioning thereof corresponding to the *in* and *out* positioning of the handle 70.

Connecting to the terminals 155 of the potentiometer are electrical conductors 156 leading to a control box 157. A source of electrical power is also connected to the control box 157 in a manner well known, such that by varying the setting of the potentiometer 154 the energization of the modulating actuator is adjusted to thereby adjust the valve 25 controlling the pressure of the fluid passing to the modulated clutch. Other control signals may also be fed into the control to modify the signal fed to the modulating actuator from the potentiometer, as desired. In this manner the degree of engagement of the modulated clutch is set by pushing and pulling on the handle to longitudinally position the rod 71, and the control operates such that pulling out on the handle 70, that is, moving the handle away from the housing 72 to the solid line position shown in FIG. 9, engages the modulated clutch, while movement of the handle to the dotted line position shown progressively disengages the modulated clutch. As the clutch is engaged the vehicle speed increases until a full speed condition for the drive ratio to which the transmission is set is reached when the handle is set at the solid line position in FIG. 9.

To limit the longitudinal movement of the handle, grooves 160 and 161 are arranged on the rod 130 at each limit of movement of the follower 150, which when engaged by one or the other of the rollers 146 will seat the rollers sufficiently to lock the rod 71 in the *in* or *out* position corresponding to the full speed or stopped position of the handle. The speed of the vehicle also can be varied in other ways, such as by regulating the fuel input to the engine in response to the same in and out movement of the handle.

By this control, the operator may independently set the drive direction and the drive ratio of the transmission by turning the handle and pushing it to one side to swivel it to a drive selection position, respectively, where it remains under force of the spring mechanisms. With the handle set in any of these positions he may speed up or slow the vehicle according to the requirements of the work being accomplished, by manipulating the single handle of the control described herein. Naturally, where only three drive ratio positions are described, by merely changing the aperture plate 76 and repositioning the reed switches on the plate 125, transmissions having more or fewer drive ratios can be regulated by the same basic control mechanism.

I claim as my invention:

1. A control mechanism for manual operation to regulate a power system for driving a load, said power system including a prime mover drivingly connected to the load through a modulated clutch and a multi-drive-ratio reversible-drive transmission connected in tandem, said control mechanism comprising, a control rod, means supporting said rod for longitudinal movement between predetermined limits and swiveled movement to a plurality of positions each corresponding to one of the drive ratios of the transmission and rotary movement of the rod between first and second positions, a handle attached to said rod, and conveniently positioned to be manually pushed, pulled, rotated and moved to move said rod into said plurality of positions, first sensing means for signaling the longitudinal positioning said rod, second sensing means for signaling the position said rod is swiveled to, third sensing means for signaling the rotary position said rod is moved to, a modulating actuator for varying the engagement of said modulated clutch in proportion to the degree activated, first regulating means acting in response to signaling by said first sensing means to activate said modulating actuator proportionally to the longitudinal positioning of said rod, second regulating means acting in response to signaling by said second sensing means for setting the transmission in the drive ratio correponding to the swiveled positioning of said rod, and third regulating means for setting the transmission in the forward and reverse drive ratios in response to said rod being rotated to the first and second positions respectively.

2. A control mechanism for manual operation to regulate a power system for driving a load, said power system including a variable-speed power-driven shaft drivingly coupled to the load through a multi-drive ratio reversible-drive transmission, said control mechanism comprising, a control rod, means supporting said rod for longitudinal movement thereof, between predetermined limits and swivel movement to a plurality of positions each corresponding to one of the drive ratios of the transmission and rotary movement between first and second positions, a handle attached to said rod and positioned to be manually pushed, pulled, rotated and moved to move said rod into said plurality of positions, first sensing means for signaling the longitudinal positioning of said rod, second sensing means for signaling which position said rod is swiveled to, third sensing means for signaling which rotary position said rod is moved to, first regulating means acting in response to the signal of said first sensing means for varying the speed of the power driven shaft in proportion to the longitudinal positioning of said rod, second regulating means acting in response to the signal of said second sensing means for setting the transmission in the drive ratio corresponding to the swivel positioning of said rod, and third regulating means for setting the transmission in the forward and reverse drive ratios in response to said rod being rotated to the first and second positions respectively.

3. A control mechanism for manual operation to regulate a power system for driving a load, said power system including a variable-speed power-driven shaft coupled through a multi-drive-ratio transmission to a load, said control mechanism comprising, a control rod, means supporting said rod for longitudinal movement thereof between predetermined limits and swivel movement to a plurality of positions each corresponding to one of the drive ratios of the transmission, a handle attached to said rod and positioned to be manually pushed, pulled and moved to move said rod into said plurality of positions, first sensing means for signaling the longitudinal positioning of said rod, second sensing means for signaling which position said rod is swiveled to, first regulating means acting in response to the signal of said first sensing means for varying the speed of the power driven shaft in proportion to the longitudinal positioning of said rod, and second regulating means acting in response to the signal of said second sensing means for setting the transmission in the drive ratio corresponding to the swivel positioning of said rod.

4. A control mechanism for manual operation to regulate a power system for driving a load, said power system including a multi-drive-ratio reversible-drive transmission drivingly connected between a prime mover and the load, said control mechanism comprising, a control rod, means supporting said rod for swivel movement thereof to a plurality of positions each corresponding to one of the drive ratios of the transmission and rotary movement between first and second positions, a handle attached to said rod and positioned to be manually rotated and pivoted to move said rod into said plurality of positions, first sensing means for signaling which position said rod is swiveled to, second sensing means for signaling when the rod is rotated to the first and second positions, first regulating means acting in response to the signal of said first sensing means for setting the transmission in the drive ratio corresponding to the swivel positioning of said rod, and second regulating means acting in response to the signal of said second sensing means for setting the transmission in forward and reverse drive when the rod is moved to the first and second rotary positions respectively.

5. A control mechanism for manual operation to regulate a power system for driving a load, said power system including a variable speed power driven shaft coupled through a reversible drive transmission to a load, said control mechanism comprising, a control rod, means supporting said rod for longitudinal movement thereof between predetermined limits and rotary movement thereof between first and second positions, a handle attached to said rod and positioned to be manually pushed, pulled and twisted to move said rod accordingly, first sensing means for signaling the longitudinal positioning of said rod, second sensing means for signaling which rotary position said rod is set to, first regulating means acting in response to the signal of said first sensing means for varying the speed of the power driven shaft in proportion to the longitudinal positioning of said rod, and second regulating means acting in response to the signal of said second sensing means for setting the transmission in forward and reverse drive when said rod is moved to the first and second rotary positions respectively.

6. A manually operated control mechanism for a power drive system including a prime mover coupled through a modulated clutch and a multi-drive-ratio reversible-drive transmission to the load, the combination of, a control rod, means supporting said rod for independent pivotal, rotary and longitudinal movement, detection means for sensing and signaling independently the longitudinal, rotary and pivotal positioning of said rod, mechanism adjustable for setting the drive ratio and drive direction of the transmission and for proportionally engaging the modulated clutch, regulating means acting in response to the independent signals of said detection means for adjusting said mechanism to set the drive ratio and drive direction of the transmission and proportionally engaging the clutch each in response to one of the signals indicating the pivotal, rotary and longitudinal positioning of the rod whereby by movement of a single rod the power drive system may be controlled.

7. A control mechanism for manual operation to regulate a power drive system including a variable-speed power-driven shaft coupled through a multi-ratio reversible-drive transmission to a load, comprising, a control rod, means supporting the control rod for independent pivotal, rotary and longitudinal positioning of said rod, means enabling manual movement of the rod, sensing means for signaling independently the pivotal, rotary and longitudinal positioning of said rod, a first mechanism for adjusting the speed of rotation of said power driven shaft, second and third mechanism for changing the drive ratio and drive direction respectively of said transmission, and means responsive to the independent signals of said detection means for regulating said first, second and third mechanisms, each in response to a separate positioning signal whereby manual movement of a single control rod regulates the power drive system.

8. A control mechanism for manual operation to regulate a power drive system having first, second and third control functions to be regulated, comprising, a control rod, means supporting said control rod for independent longitudinal, rotary and pivotal movement thereof, a handle attached to said rod and positioned for manual movement to position the rod, means for independently sensing and signaling the longitudinal, rotary and pivotal positioning of said rod, and means acting in response to the signaling by said sensing means for regulating the first, second and third control functions of the system in response to the longitudinal, rotary and pivotal positioning of said rod, respectively.

References Cited by the Examiner

UNITED STATES PATENTS

| | | |
|---|---|---|
| 2,202,866 | 6/1940 | Price. |
| 3,061,058 | 10/1962 | Barth _____ 192—3.5 |
| 3,205,983 | 9/1965 | Chivsa _____ 192—3.5 |

FOREIGN PATENTS

| | | |
|---|---|---|
| 569,136 | 5/1945 | Great Britain. |

BENJAMIN W. WYCHE III, *Primary Examiner.*